(12) United States Patent
Tanaka et al.

(10) Patent No.: US 10,023,400 B2
(45) Date of Patent: Jul. 17, 2018

(54) ARTICLE VACUUM HOLDING SYSTEM AND ARTICLE HOLDING DEVICE

(71) Applicant: Kabushiki Kaisha Toshiba, Minato-ku (JP)

(72) Inventors: Junya Tanaka, Ota (JP); Akihito Ogawa, Fujisawa (JP); Hideichi Nakamoto, Setagaya (JP); Atsushi Sugahara, Kawasaki (JP); Takafumi Sonoura, Yokohama (JP); Haruna Eto, Arakawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/394,948

(22) Filed: Dec. 30, 2016

(65) Prior Publication Data

US 2017/0253438 A1  Sep. 7, 2017

(30) Foreign Application Priority Data

Mar. 4, 2016  (JP) .................. 2016-042763

(51) Int. Cl.
*B65G 47/91* (2006.01)
*B25J 9/16* (2006.01)
*B25J 9/00* (2006.01)
*B25J 15/06* (2006.01)

(52) U.S. Cl.
CPC .......... *B65G 47/917* (2013.01); *B25J 9/0018* (2013.01); *B25J 9/1612* (2013.01); *B25J 15/0616* (2013.01); *B65G 47/912* (2013.01)

(58) Field of Classification Search
CPC ........ B65G 47/917; B25J 15/06; B25J 9/0018
USPC .......... 294/183, 185, 186, 189, 65; 414/627; 901/40
See application file for complete search history.

(56) References Cited

U.S. PATENT DOCUMENTS

| | | | | |
|---|---|---|---|---|
| 2,546,838 A * | 3/1951 | Tasche | ............ | A01C 1/02 111/200 |
| 3,077,993 A * | 2/1963 | Mulvany | ............ | B65B 23/08 294/184 |
| 3,696,596 A * | 10/1972 | Wegscheid | ............ | A01D 45/00 294/186 |
| 3,826,485 A * | 7/1974 | Shindo | ............ | B65H 3/0816 271/106 |
| 3,999,795 A * | 12/1976 | Barker | ............ | B66C 1/0212 271/108 |

(Continued)

FOREIGN PATENT DOCUMENTS

JP  2007-537961 A  12/2007
JP  5126842 B2  1/2013

*Primary Examiner* — Paul T Chin
(74) *Attorney, Agent, or Firm* — Oblon, McClelland, Maier & Neustadt, L.L.P.

(57) ABSTRACT

An article holding system according to an embodiment is an article holding system which is provided with a fixed portion, a movable portion, a hollow member located between the fixed portion and the movable portion, a drawing portion to draw in the hollow member, and a fluid control device to supply fluid to an inside of the hollow member, wherein the hollow member deforms in a state that the fluid is supplied by the fluid control device, and the hollow member is drawn out from the drawing portion, to change a distance between the fixed portion and the movable portion.

12 Claims, 10 Drawing Sheets

(56) References Cited

U.S. PATENT DOCUMENTS

| | | | | |
|---|---|---|---|---|
| 4,132,516 | A * | 1/1979 | Story | B29C 73/00 |
| | | | | 156/382 |
| 4,351,518 | A * | 9/1982 | Stievenart | B65H 3/0808 |
| | | | | 198/468.4 |
| 4,662,668 | A * | 5/1987 | Hufford | B25J 13/086 |
| | | | | 294/185 |
| 5,064,183 | A * | 11/1991 | Nishigaki | B65H 3/0883 |
| | | | | 271/107 |
| 5,324,087 | A * | 6/1994 | Shimose | B65G 47/91 |
| | | | | 294/185 |
| 7,677,622 | B2 * | 3/2010 | Dunkmann | B65G 47/917 |
| | | | | 294/188 |
| 8,485,579 | B2 * | 7/2013 | Roajanasiri | G11B 5/41 |
| | | | | 294/183 |
| 2007/0205405 | A1 * | 9/2007 | Stockmaster | B66D 3/18 |
| | | | | 254/275 |
| 2007/0241575 | A1 | 10/2007 | Lundin | |

* cited by examiner

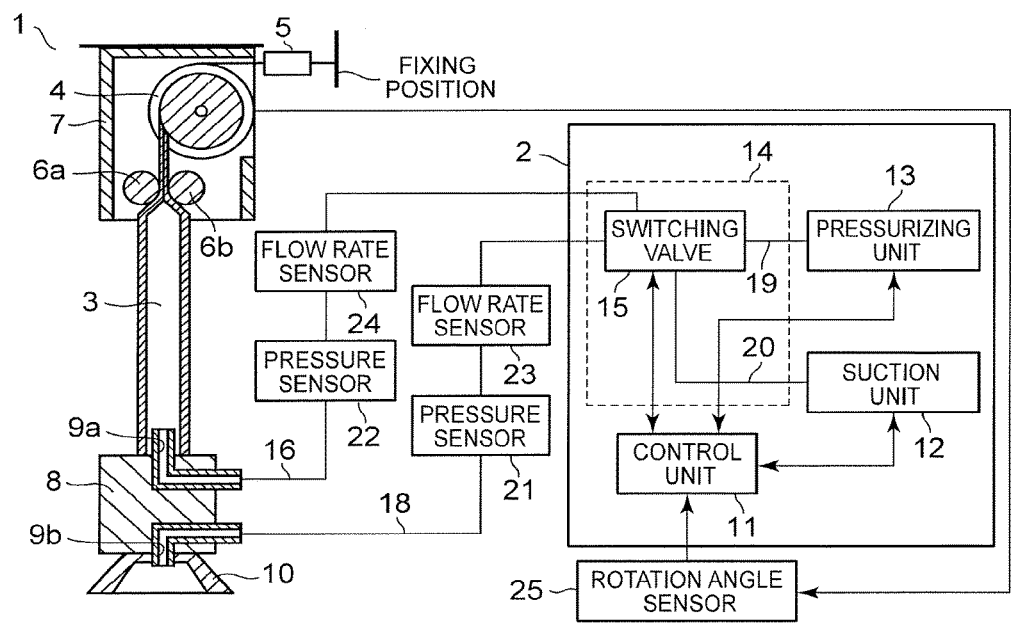
FIG. 1
FIG. 2A    FLAT STATE
FIG. 2B    EXPANSION STATE
(NON-FLAT STATE)
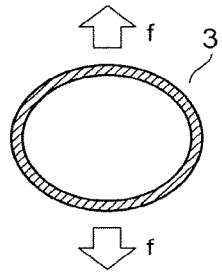

FIG. 17A
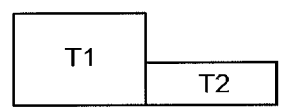
FIG. 17B
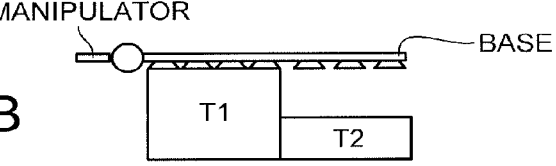
FIG. 17C
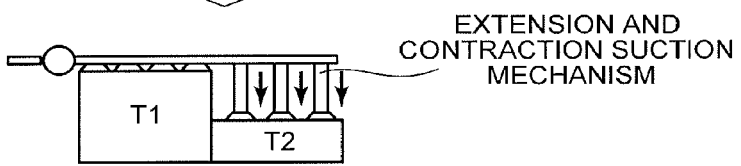
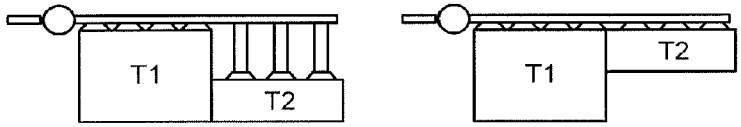
FIG. 17D    FIG. 17E

ARTICLE VACUUM HOLDING SYSTEM AND ARTICLE HOLDING DEVICE

CROSS-REFERENCE TO RELATED APPLICATION

This application is based upon and claims the benefit of priority from the prior Japanese Patent Application No. 2016-042763, filed on Mar. 4, 2016, the entire contents of which are incorporated herein by reference.

FIELD

Embodiments of the present invention relates to an article holding system, an article holding device and an article holding method.

BACKGROUND

Presently, in the circulation and physical distribution industries, amounts of handling packages tend to increase, by the enlargement of the mail order market. For this reason, each of physical distribution industry companies works on automation of a physical distribution system.

Regarding conveyance and storage of packages in a warehouse, automation thereof is advancing using a belt conveyor or the like, but a transfer work to move a package to another place, such as discharging and picking, it is difficult to automate such a work, and thereby device for automatization is required.

As a device which has automated such a transfer work, a suction holding device which sucks a package by making a suction pad in contact with an upper surface of the package, and lifts and moves the package to a desired place is known.

In the case of using a general suction holding device, when an upper surface of a package is inclined to the horizontal surface due to collapse of the package, or when an upper surface itself of the package is curved, it is difficult to make a suction pad suck the upper surface of the package. In addition, in the case of taking out a package in a tall basket out using a general suction holding device, it is necessary to prepare a suction holding device which is long enough to reach the bottom surface of the tall basket, and accordingly the long suction holding device might come in contact with the ambient environment. For example, when an operation in which a plurality of suction pads are provided in parallel on a hand, and a plurality of packages are sucked and held simultaneously is thought of, if the sizes of the packages are different, the heights of the upper surfaces of the packages are different, and thereby it is difficult of suck the whole package simultaneously, to cause a transfer working time to become long.

BRIEF DESCRIPTION OF THE DRAWINGS

FIG. 1 is a diagram showing an article holding system according to a first embodiment.

FIG. 2A is a diagram showing the flat tube.

FIG. 2B is a diagram showing the flat tube.

FIG. 17A is an operation diagram showing the article holding system according to the fifth embodiment.

FIG. 17B is an operation diagram showing the article holding system according to the fifth embodiment.

FIG. 17C is an operation diagram showing the article holding system according to the fifth embodiment.

FIG. 17D is an operation diagram showing the article holding system according to the fifth embodiment.

FIG. 17E is an operation diagram showing the article holding system according to the fifth embodiment.

DETAILED DESCRIPTION

Figure 3:
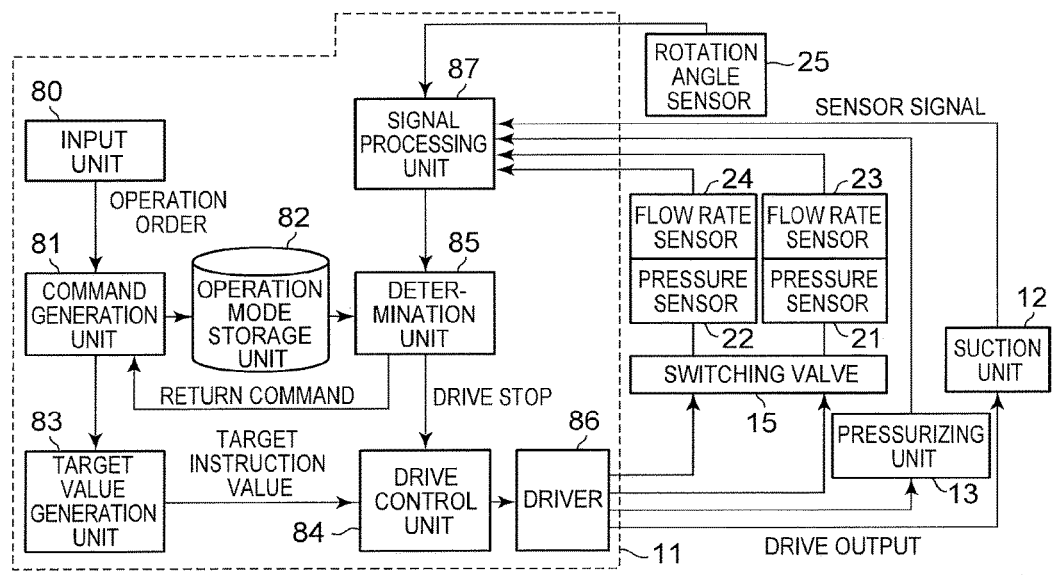
FIG. 3 is a configuration diagram of the fluid control device and the respective sensors.

Hereinafter, article holding systems according to embodiments will be described with reference to the drawings. Ones given with the same symbols indicate the same ones. In addition, the drawings are schematic or conceptual, and the relation between a thickness and a width in each portion, and a ratio coefficient of size between portions, and so on are not necessarily the same as the actual ones. In addition, when the same portion is shown, the respective dimensions and ratio coefficients may be shown in different sizes and values depending on the drawings.

First Embodiment

FIG. 1 is an article holding system according to a first embodiment. The article holding system is composed of an article holding device 1 and a fluid control device 2 connected to this. Regarding the article holding device 1 of FIG. 1, a schematic sectional view thereof is shown so that the internal structure thereof can be understood.

The article holding device 1 is provided with a base 7, a holding portion 8 having a suction pad 10 for holding an article, and a hollow member 3 located between the base 7 and the holding portion 8. In the base 7, a winding portion 4 to wind the hollow member 3 and a pair of a roller 6a and a roller 6b to sandwich the hollow member 3 at a prescribed interval are provided. In the case of the base 7 fixed to a ceiling or the like, for example, one end of the hollow member 3 is fitted to the winding portion 4, and the other end of the hollow member 3 is fitted to the holding portion 8, and thereby the holding portion can be lifted.

The holding portion 8 includes a joint 9a for supplying fluid to the hollow member 3, and a joint 9b for supplying fluid to the suction pad 10.

The hollow member 3 is tubular, and may be one which can expand and contract by supplying and discharging fluid to and from the inside thereof. As the hollow member 3, a flat tube is preferable, for example. The flat tube 3 becomes in an expansion state when the inside is filled with fluid, and becomes in a flat state when the fluid is discharged.

The fluid control device 2 is composed of a control unit 11, a suction unit 12, a pressurizing unit 13, an electromagnetic valve 14. The electromagnetic valve 14 is provided with a switching valve 15. The fluid control device 2 is a portion which controls a pressure of fluid which is supplied to or discharged from the flat tube 3, such as air. The fluid includes gas such as gas and liquid such as water, in addition to air.

In the base 7, the winding portion 4, the roller 6a and the roller 6b are arranged, for example. The roller 6a and the roller 6b are arranged so as to sandwich the flat tube 3. Each of the roller 6a and the roller 6b is a driven rotary roller. The flat tube 3 is hollow, and it is possible to flow fluid through the inside thereof, and it can deform in accordance with an amount of the fluid. One end of the flat tube 3 is wound into a circumferential shape by the winding portion 4. A stress load portion 5 is arranged between the winding portion 4 and a fixing position. The winding portion 4 is biased in the direction to wind the flat tube 3 by the stress of the stress load portion 5. The stress load portion 5 may be anything as long as it can generate an elastic force constantly, such as a constant force spring. In addition, the stress load portion 5 does not always bias the winding portion 4 in the direction to wind the flat tube 3, and may release the stress at the time of delivering the flat tube 3.

The holding portion 8 includes the joint 9a, the joint 9b and suction pad 10. The flat tube 3 is communicated with the joint 9a. The suction pad 10 is communicated with the joint 9b.

The winding portion 4 may be provided with a rotation angle sensor 25 to detect a rotation angle thereof. The rotation angle sensor 25 is connected to the control unit 11.

The flat tube 3 is connected to the switching valve 15 provided in the fluid control device 2 via the joint 9a and a tube 16. The suction pad 10 is connected to the switching valve 15 provided in the fluid control device 2 via the joint 9b and a tube 18. A pressure sensor 22 and a flow rate sensor 24 are connected to the tube 16. A pressure sensor 21 and a flow rate sensor 23 are connected to the tube 18. The pressure sensor 21, the pressure sensor 22, the flow rate sensor 23, the flow rate sensor 24, and the rotation angle sensor 25 may be called a first pressure detection unit, a second pressure detection unit, a first flow rate detection unit, a second flow rate detection unit, and a rotation angle detection unit, respectively.

The switching valve 15 is connected to the pressuring unit 13 via a tube 19. The switching valve 15 is connected to the suction unit 12 via a tube 20.

The control unit 11 controls the switching valve 15, the pressurizing unit 13 and the suction unit 12.

When supplying fluid to the flat tube 3, the suction pad 10, the control unit 11 controls the switching valve 15, and controls so as to connect at least arbitrary one of the tubes 16, 18 to the tube 19. The control unit 11 controls the pressurizing unit 13, to supply fluid to at least arbitrary one of the flat tube 3, the suction pad 10. When sucking fluid from the flat tube 3, the suction pad 10, the control unit 11 controls the switching valve 15, and controls so as to connect at least arbitrary one of the tubes 16, 18 to the tube 20. The control unit 11 controls the suction unit 12, to suck fluid from at least arbitrary one of the flat tube 3 and the suction pad 10.

A compressor may be used as the pressurizing unit 13. A vacuum pump may be used as the suction unit 12. One which generates negative pressure by combining the pressurizing unit and a vacuum generator may be used, except a vacuum pump. In addition, the switching valve 15 may be a valve of a type which operates by air pressure.

Each of the tube 16, the tube 18, the tube 19, and the tube 20 is preferably a flexible tube, and it is preferable that each does not expand and burst by being pressurized, and does not collapse by being sucked.

The fluid to be supplied to the flat tube 3 may be inert gas, water, oil or the like, for example. As the flat tube 3, an elastic member which can expand and contract, and the deformation direction of which is regulated to one direction may be used.

As the rotation angle sensor 25, an encoder, a potentiometer or the like is used. The pressure sensor 21 and the pressure sensor 22 detect pressures in the respective inner spaces of the tube 18 and the tube 16, and thereby the control unit 11 judges presence or absence of damage of the flat tube 3, and judges presence or absence of the suction state of the suction pad 10.

The flow rate sensor 23, the flow rate sensor 24 detect flow rates of fluids flowing into the tube 18 and the tube 16, respectively, and thereby the control unit 11 estimates a deformation speed of the flat tube 3, and detects a leakage flow rate and so on between the suction pad 10 and an object.

In FIG. 2A, a cross section of the flat tube 3 is shown, and in FIG. 2B, a cross section of the expanded flat tube 3 is shown.

The flat tube 3 is one obtained by such a manner that, in the state that a thermoplastic tube of a diameter of 12 mm, for example, is heated, a sectional shape thereof is formed into a flat shape by pressure-welding, and then it is cooled in that state. For example, a material of the thermoplastic tube is made of urethane, nylon, fluorine resin, polyolefin, polyurethane elastomer, or the like.

When fluid is not supplied into the flat tube 3, a cross section of the flat tube 3 becomes in a flat state. When fluid is supplied into the flat tube 3, forces "f" are generated in the short directions of the cross section of the flat tube 3 (refer to FIG. 2).

The inside of the frame of the broken line of FIG. 3 is a diagram showing the control unit 11 shown in FIG. 1 in detail. The control unit 11 is composed of an input unit 80, a command generation unit 81, an operation mode storage unit 82, a target value generation unit 83 to generate a target instruction value, a drive control unit 84, a determination unit 85, a driver 86, a signal processing unit 87.

The input unit 80 sends an operation order to the command generation unit 81. The command generation unit 81 generates an operation procedure required for each operation process in accordance with the operation order, as an operation command.

The command generation unit 81 sends operation mode information in accordance with the operation command to be executed to the operation mode storage unit 82. The operation mode storage unit 82 stores the operation mode information.

The operation mode storage unit 82 also stores attribute data such as a shape, a weight, flexibility of an object.

As the operation mode, there are operations such as an operation to stop an operation of the switching valve 15, and an operation to hold an inner pressure of the flat tube 3.

The operation order is an order relating to a series of operations of the article holding device 1, and is stored in the form of a program. The operation order may be instructed such that an operator touches an order command which is displayed on a panel by the input unit 80, or can be instructed by voice of an operator.

The input unit 80 may be integral with the article holding device 1, or may be one which can transmit an order to the article holding device 1 by wire or wireless.

The target value generation unit 83 receives an instruction of an operation command to the switching valve 15 from the command generation unit 81. The target value generation unit 83 calculates a target value of the switching valve 15, and generates a target instruction value relating to the drive of the switching valve 15.

The drive control unit 84 receives the target instruction value of the switching valve 15 from the target value generation unit 83, and generates a drive instruction for driving the switching valve 15 in accordance with the target instruction value.

The driver 86 receives the drive instruction of the switching valve 15 from the drive control unit 84, and generates a drive output of the switching valve 15. The switching valve 15 receives the drive output from the driver 86, and operates the switching valve 15, to adjust an amount of the fluid to be supplied. As the switching valve 15, a combination of an electromagnetic solenoid and a bulkhead member, or a combination of an electromagnetic rotary motor and a bulkhead member can be used, for example.

Each of the pressure sensors 21, 22 senses an operation of the switching valve 15, to generate a sensor signal. The sensor signal is a voltage value, for example.

Each of the flow sensors 23, 24 senses an operation of the switching valve 15, to generate a sensor signal. The sensor signal is a voltage value, for example. The switching valve 15 receives the drive output from the driver 86.

The rotation angle sensor 25 senses a winding amount or a delivery amount of the flat tube 3 that is an operation amount of the winging portion 4, to generate a sensor signal. The sensor signal is a voltage value, for example. As the rotation angle sensor 25, a potentiometer, a photo sensor, an encoder, or a pulse coder can be used.

The signal processing unit 87 receives the respective sensor signals, and performs signal processing such as a signal amplification processing or an analog digital conversion processing to the respective sensor signals.

The determination unit 85 receives the converted sensor signals from the signal processing unit 87. The determination unit determines presence or absence of adjustment of the fluid supply amount, and holding of an object, in accordance with the sensor signals. The determination unit 85 receives the operation mode information from the command generation unit 81 in accordance with the determination result. The determination unit 85 extracts an operation of the switching valve 15 corresponding to the operation mode information from the operation mode storage unit 82. The determination unit 85 generates commands of such as, stopping of the drive of the switching valve 15 and switching thereof.

The determination unit 85 generates a return value command to modify the target value to the command generation unit 81.

The command generation unit 81 can execute a corresponding processing operation suitable for the present operation by the return value command, and thereby keeps reliability and certainty of the operation of the article holding device 1.

Figures 4A, 4B, 4C:
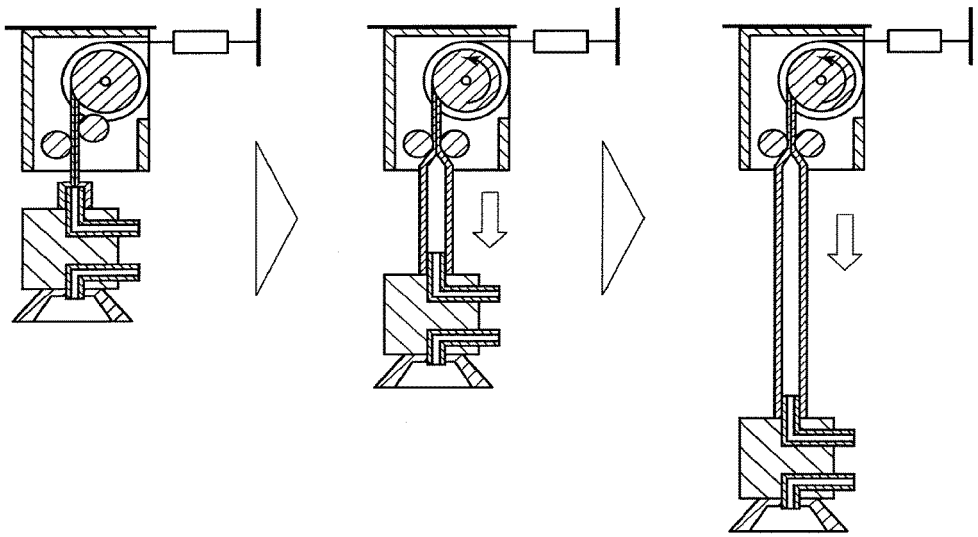
FIG. 4A is a diagram showing an extension operation of the article holding device according to the first embodiment.
FIG. 4B is a diagram showing an extension operation of the article holding device according to the first embodiment.
FIG. 4C is a diagram showing an extension operation of the article holding device according to the first embodiment.

An aspect of an extension operation of the present embodiment is shown in FIG. 4. Extension and contraction operations of the article holding device 1 are realized by the movements that the suction pad 10 moves in a first direction at a first side of a sandwiching position where the opposite roller 6a and roller 6b sandwich the flat tube 3, and moves in a second direction different from the first direction at a second side of the sandwiching position.

Fluid flows into the inside of the flat tube 3, and thereby the flat tube 3 expands. Since the flat tube 3 is sandwiched by the roller 6a and the roller 6b from the opposite sides, the expansion of the flat tube 3 is blocked by the sandwiching position of the roller 6a and the roller 6b. At this time, the fluid is further flowed into the inside of the flat tube 3, and thereby the volume inside the flat tube 3 increases, and the inner pressure thereof becomes high, and if a product of the inner pressure of the flat tube 3 and an area of the sandwiching position (an area where the roller 6a and the roller 6b are in contact with the flat tube 3) of the roller 6a and the roller 6b becomes larger than the stress of the stress load portion 5, the winding portion 4 rotates, to send out the flat tube 3. By this means, the flat tube 3 extends.

Figures 5A, 5B, 5C, 5D:
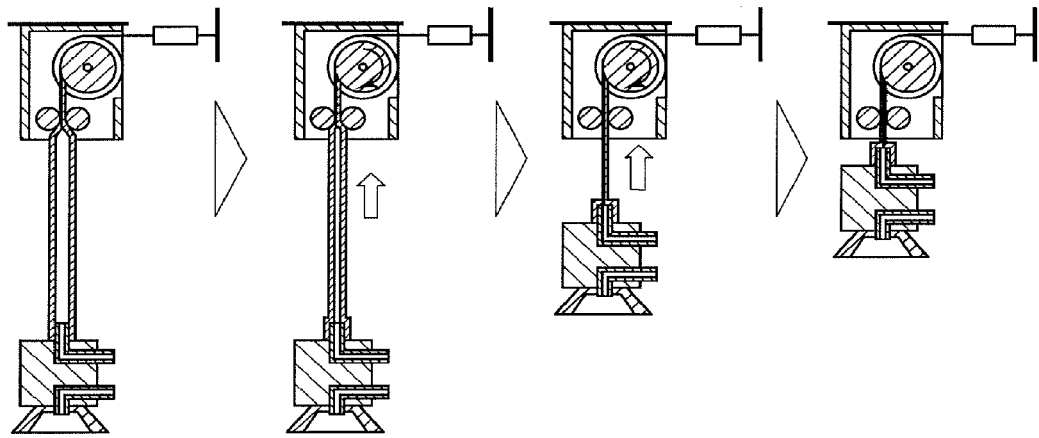
FIG. 5A is a diagram showing a contraction operation of the article holding device according to the first embodiment.
FIG. 5B is a diagram showing a contraction operation of the article holding device according to the first embodiment.
FIG. 5C is a diagram showing a contraction operation of the article holding device according to the first embodiment.
FIG. 5D is a diagram showing a contraction operation of the article holding device according to the first embodiment.

An aspect of a contraction operation of the present embodiment is shown in FIG. 5. In the case of contracting the flat tube 3 from the extended state, the fluid inside the flat tube 3 is flowed out, to decrease the inner pressure. According to this, the cross section of the flat tube 3 becomes in a flat state. The inner pressure of the flat tube 3 decreases, and if the product of the inner pressure of the flat tube 3 and the area of the sandwiching position of the rollers 6a, 6b becomes smaller than the stress of the stress load portion 5 of the winding portion 4, the winding portion 4 is rotated by the stress, to wind the flat tube 3. By this means, the flat tube 3 contracts.

When the flat tube 3 is housed in the winding portion 4, it is in a flat state, and is wound in a roll shape. By this means, the housing volume becomes small in contrast to the extension amount.

The suction pad 10 of the present embodiment is provided with the tube 18 connecting the switching valve 15 and the suction pad 10. The suction pad 10 is of a type in which the inner space thereof is positively evacuated by a vacuum pump or the like of the suction unit 12.

The flat tube 3 is fitted in a posture in which the direction along its central axis, that is, the extension and contraction direction is along the vertical direction. The suction pad 10 or the like that is the holding portion is fitted to a lower end (one end) side of the flat tube 3. In addition, the winding portion 4 is fitted to an upper end (the other end) side of the flat tube 3, to wind and house the flat tube 3. That is, the upper end and the lower end are blocked, and thereby a sealed inner space is formed inside the flat tube 3.

The suction pad 10 is fitted on the lower surface side of the holding portion 8. The suction pad 10 is fitted on the lower end side of the flat tube 3 in a straight posture that its suction surface is arranged along a plane in parallel with the opening portion of the flat tube 3. On the other hand, the base 7 that is a fixed portion where the winding portion 4 is provided is connected to a manipulator not shown here. That is, the article holding device 1 of the present embodiment can be moved to a desired position by an operation of the manipulator.

A control system of the article holding device 1 has the control unit 11. The switching valve 15 such as an electromagnetic valve 14 is connected to the control unit 11. The pressurizing unit 13 such as a compressor and the suction unit 12 such as a vacuum pump are switchably connected to one end side of the switching valve 15. And, the other end side of the switching valve 15 is communicated with the inner space of the flat tube 3 of the article holding device 1, via the tube 16.

In the case of extending the flat tube 3 of the article holding device 1, the control unit 11 connects the switching valve 15 to the pressurizing unit 13, and makes the pressurizing unit 13 operate, to send air (fluid) into the inner space of the flat tube 3 of the article holding device 1. By this means, the pressure of the inner space increases, the flat tube 3 expands, and the suction surface of the suction pad 10 is contacted to a surface to be sucked of a suction object not shown, and sucks it.

On the other hand, in the case of contracting the flat tube 3 of the article holding device 1, the control unit 11 connects the switching valve 15 to the suction unit 12, and makes the suction unit 3 operate, to evacuate the inner space of the flat tube 3 of the article holding device 1. By this means, the pressure of the inner space decreases, and the flat tube 3 contracts.

In the present embodiment, air is sent into the inner space of the flat tube 3 or the inner space is evacuated, and thereby the flat tube 3 is extended and contracted, but the fluid to be sent into the inner space is not limited to air, but gas such as inert gas, or liquid such as water and oil can be used.

Hereinafter, an example of an operation by the above-described article holding device 1 will be described with reference to FIG. 6. Here, a case is assumed in which a surface Ta to be sucked of a suction object T is inclined to a floor surface F. A cardboard box is assumed as the suction object T. In addition, in each drawing, a part of an arm of a manipulator is shown.

To begin with, a manipulator is operated, to arrange the article holding device 1 immediately above the suction object T, as shown in FIG. 6. As an initial state, the flat tube 3 of the article holding device 1 contracts to the shortest state as shown in the drawing. At this time, the article holding device 1 is arranged such a height that the suction surface of the suction pad 10 can be pressed to the surface Ta to be sucked by a sufficient pressing force when the flat tube 3 is extended to the longest state.

Next, the flat tube 3 is extended, to press the suction surface of the suction pad 10 to the surface Ta to be sucked of the suction object T. At this time, the pressing force of the suction pad 10 can be adjusted to an arbitrary value by controlling the pressurizing unit 13. When the suction surface is pressed to the surface Ta to be sucked, the suction pad 10 sucks the surface Ta to be sucked. At this time, since the surface Ta to be sucked is inclined to the floor surface F, the suction surface of the suction pad 10 sucks in a state inclined to the floor F. The inclination of the suction pad 10 is absorbed by the elastic deformation of the suction tube 3.

Figures 6A, 6B, 6C:
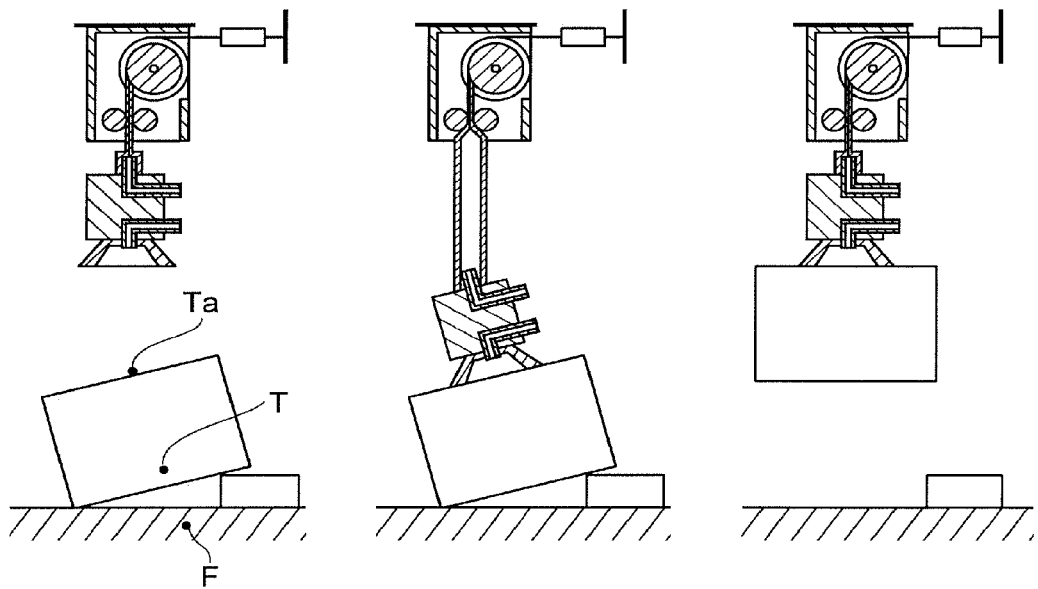
FIG. 6A is a diagram showing a holding operation of the article holding device according to the first embodiment.
FIG. 6B is a diagram showing a holding operation of the article holding device according to the first embodiment.
FIG. 6C is a diagram showing a holding operation of the article holding device according to the first embodiment.

That is, when the flat tube 3 extends, to begin with, the suction surface of the suction pad 10 partially comes in contact with the surface Ta to be sucked of the suction object T, and the suction surface is gradually inclined along the slope of the surface Ta to be sucked, and then the suction pad 10 is also inclined. This state is shown in FIG. 6B. In this state, the suction surface of the suction pad 10 is in contact with the surface Ta to be sucked of the suction object T on the whole surface. When the suction pad 10 is inclined, the holding portion 8 connecting the suction pad 10 is also inclined as shown in the drawing, and the nearby lower end of the flat tube 3 is elastically deformed and is curved as shown in FIG. 6B, in accordance with the inclination of the holding portion 8.

When the flat tube 3 is contracted from this state as shown in FIG. 6C, the suction object T sucked by the suction pad 10 is lifted upward from the floor surface F. At this time, a pulling force acting on the article holding device 1 can be adjusted by selecting the stress load portion 5 connected to the winding portion 4 to an arbitrary stress. Accordingly, here, the stress load portion 5 is selected so that the pulling force that is a little larger than the maximum weight of the suction object T is obtained.

Next, an operation of the suction pad 10 will be described. In the case of making the suction object T to be sucked using this article holding device 1, to begin with, the control unit 11 makes the suction tube 3 extend, to make the suction pad 10 in contact with the surface Ta to be sucked of the suction object T. And the control unit 11 switches the switching valve 15 so as to connect the suction unit 12 to the suction pad 10, to evacuate the suction pad 10. That is, in the present embodiment, the suction unit 12 functions as a negative pressure generator. A timing when the suction pad 10 is made contact with the suction object T and a timing when evacuation is started may be reverse.

At any rate, according to the present embodiment, it is possible to surely make the suction object T to be sucked to the suction pad, without pressing the suction surface of the suction pad 10 to the surface Ta to be sucked of the suction object T.

Then, the control unit 11 switches the switching valve 15 so as to make the suction unit 12 communicate with the inner space of the flat tube 12, to contract the flat tube 3, and lifts the suction object T. At this time, the negative pressure acting between the suction surface of the suction pad 10 and the surface Ta to be sucked of the suction object T is maintained.

And after the suction object T has been moved to a desired place by an operation of the manipulator, the control unit 11 makes the flat tube 3 extend, to place the suction object T on the floor, and eliminates the negative pressure of the suction pad 10. At this time, the control unit 11 switches the switching valve 15 so as to connect the pressurizing unit 13 to the suction pad, and sends the pressurized air to the suction pad, and thereby the negative pressure is eliminated.

As described above, according to the present embodiment, with a simple configuration to make the flat tube 3 extend, it is possible to make the suction pad 10 to be surely sucked to the inclined surface Ta to be sucked, and thereby the reliability of the device can be improved. In particular, without caring about an inclination direction of the surface Ta to be sucked of the suction object T, the suction pad 10 is automatically inclined in an appropriate direction in accordance with the inclination, and accordingly, the control can easily be made without need of controlling the inclination direction.

In addition, the flat tube 3 is contracted to the shortest state, and thereby the device configuration can be made compact, and the article holding device 1 can be inserted into a relatively narrow gap, and thereby the device application can be enlarged.

As a drive mechanism for driving the suction pad 10, a simple configuration to only make the flat tube 3 extend and contract is employed, the device configuration can be made at a low cost, and the weight of the device can be made lightweight. By this means, a movement speed of the article holding device 1 by a manipulator can be made faster, and the power consumption can be made smaller.

Modification 1 of First Embodiment

Figure 7:
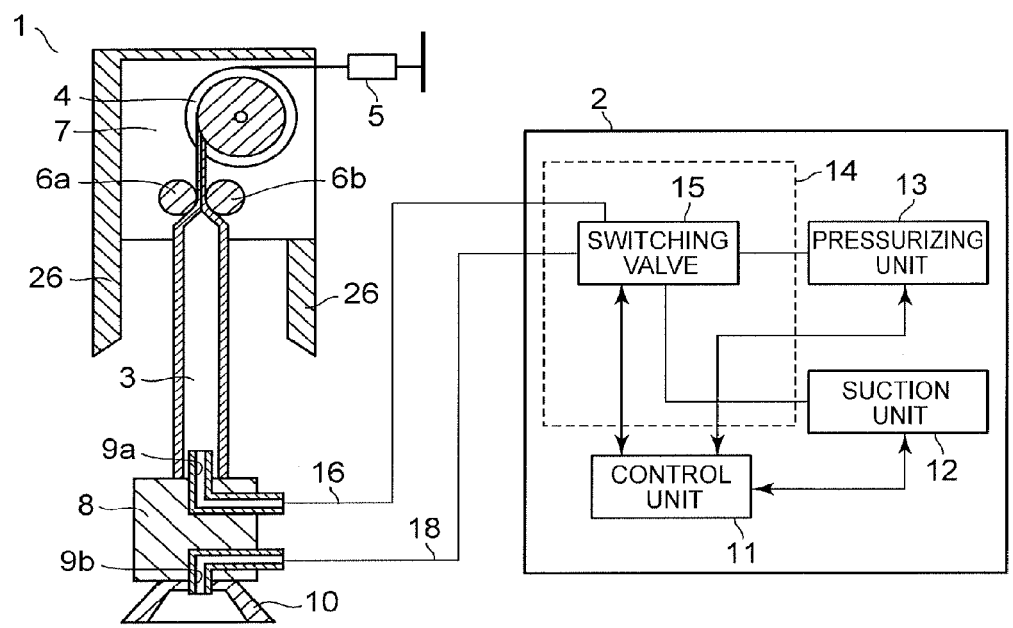
FIG. 7 is a diagram showing an article holding system according to a modification 1 of the first embodiment.

FIG. 7 shows an article holding system according to a modification 1 of the first embodiment. A projection portion is arranged at the base 7 side. A projection portion 26 may be arranged on the circumference, or columnar supports may be provided at respective apexes of a square. It is preferable that a tip end of the projection portion 26 at the side opposite to the base 7 is inclined to the flat tube 3 side.

The other configuration is the same as the article holding system of the first embodiment.

Figures 8A, 8B, 8C, 8D:
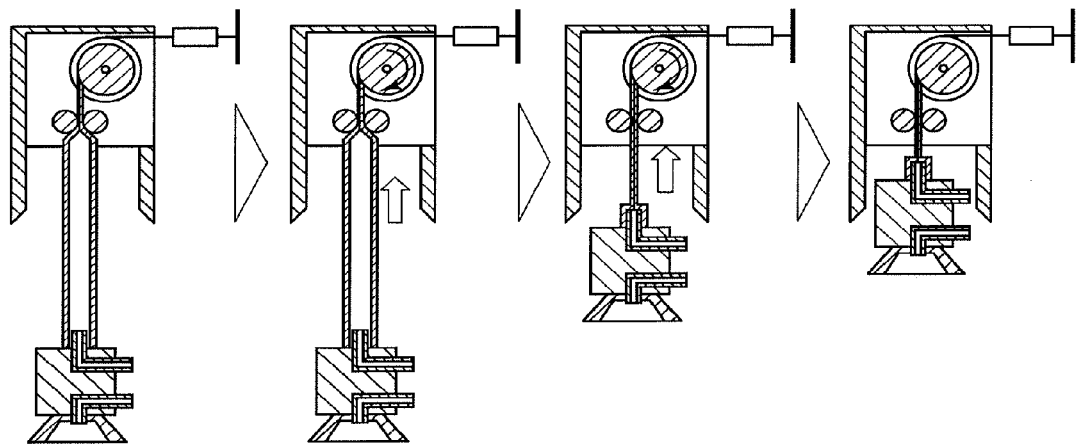
FIG. 8A is a diagram showing a reduction operation of the article holding device according to the modification 1 of the first embodiment.
FIG. 8B is a diagram showing a reduction operation of the article holding device according to the modification 1 of the first embodiment.
FIG. 8C is a diagram showing a reduction operation of the article holding device according to the modification 1 of the first embodiment.
FIG. 8D is a diagram showing a reduction operation of the article holding device according to the modification 1 of the first embodiment.

FIG. 8 is a diagram showing a contraction operation of the modification 1 of the first embodiment. The holding portion 8 and at least a part of the projection portion 26 come in contact with each other, in the state that the flat tube 3 is contracted most shortly, to exhibit characteristic like a suction portion of a rigid body. For this reason, it is made difficult for the flat tube 3 to elastically deform, and it is also possible to press the suction pad 10 to the surface to be sucked by a strong force, for example. In addition, when the projection portion 26 is not formed, if a manipulator is operated at a high speed, the suction pad 10 vibrates due to the elastic deformation of the flat tube 3, but the holding portion 8 and the projection portion 26 come in contact with each other, and thereby this vibration can be prevented.

Modification 2 of First Embodiment

Figure 9:
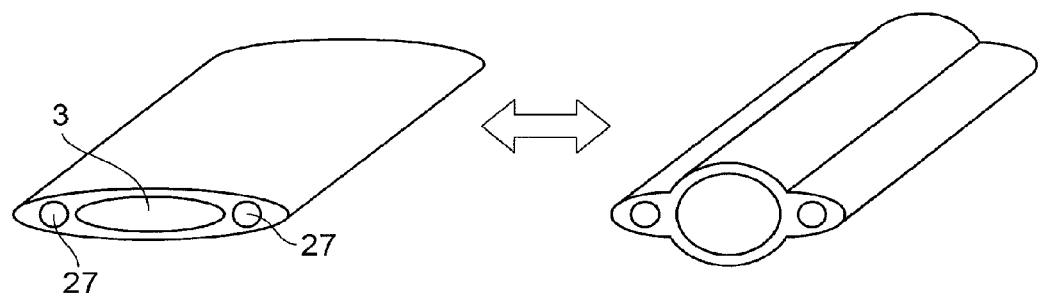
FIG. 9 is a diagram showing a structure in which tubes are arranged along side surfaces of the flat tube according to a modification 2 of the first embodiment.

FIG. 9 is an article holding system according to a modification 2 of the first embodiment. In the modification 2 of the first embodiment, small diameter tubes 27 are provided in parallel along the both side surfaces of the flat tube 3, the flat tube 3 and the small diameter tubes 27 are coated with a protective member, to form a coating tube as a whole. The other configuration is the same as the article holding device of the first embodiment. A member which can extend and contract such as rubber is preferable, as the protective member.

In the first embodiment, the tubes 16, 18 respectively connected to the joint 9a and the joint 8b are caught by other members at the time of extension and contraction operation of the flat tube 3, to block the extension and contraction operation, but in this modification 2, such a block operation can be prevented. The coating tube is wound by the winding portion 4. It is preferable that the roller 6a and the roller 6b crush only the flat tube 3 within the coating tube and come in contact with each other, and do not crush the small diameter tubes 27. For this reason, concave portion grooves with a height not less than a radius of the small diameter tube 27 are respectively provided in the surfaces of the roller 6a and the roller 6b, to prevent the rollers 6a, 6b from crushing the small diameter tubes 27. By this means, a smoother extension and contraction operation can be realized.

Modification 3 of First Embodiment

Figure 10:
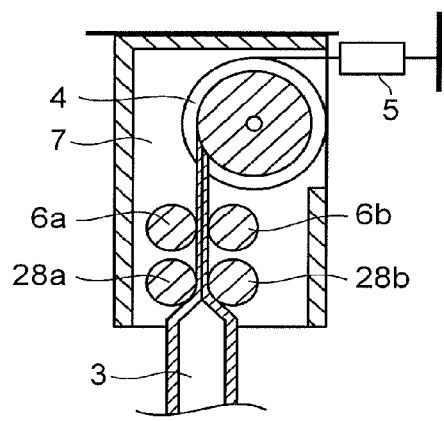
FIG. 10 is a diagram showing an article holding device according to a modification 3 of the first embodiment.

FIG. 10 is an article holding system according to a modification 3 of the first embodiment. In the modification 3 of the first embodiment, a roller 28a and a roller 28b are newly added to the roller 6a and the roller 6b of the first embodiment. The other configuration is the same as the article holding system of the first embodiment.

The roller 28a and the roller 28b are each a driven rotary roller, and are arranged opposite to each other, to crush the flat tube 3. A set of the roller 6a and the roller 6b, and a set of the roller 28a and the roller 28b crush the flat tube 3 in two stages, and thereby when the fluid is flowed into the inside of the flat tube 3 and is pressurized, it is prevented that the inner fluid gets over the roller facing positions and flows into the winding portion.

At this time, the set of the roller 28a and the roller 28b are not necessarily so near as to crush the flat tube 3, a gap may be formed between the roller 28a and the roller 28b, and in this case there is an effect to narrow down the cross section of the flat tube 3.

In addition, the roller 6a, the roller 28a and the roller 6b, the roller 28b are respectively coupled by annular belts, to form belt pulley structures. In this case, since the belts come in contact with the flat tube 3, there is an effect to narrow down the cross section of the flat tube 3.

By this means, the fluid inside the flat tube 3 is prevented from entering the winding portion side, and thereby a highly reliable extension and contraction operation can be realized.

Second Embodiment

Figure 11:
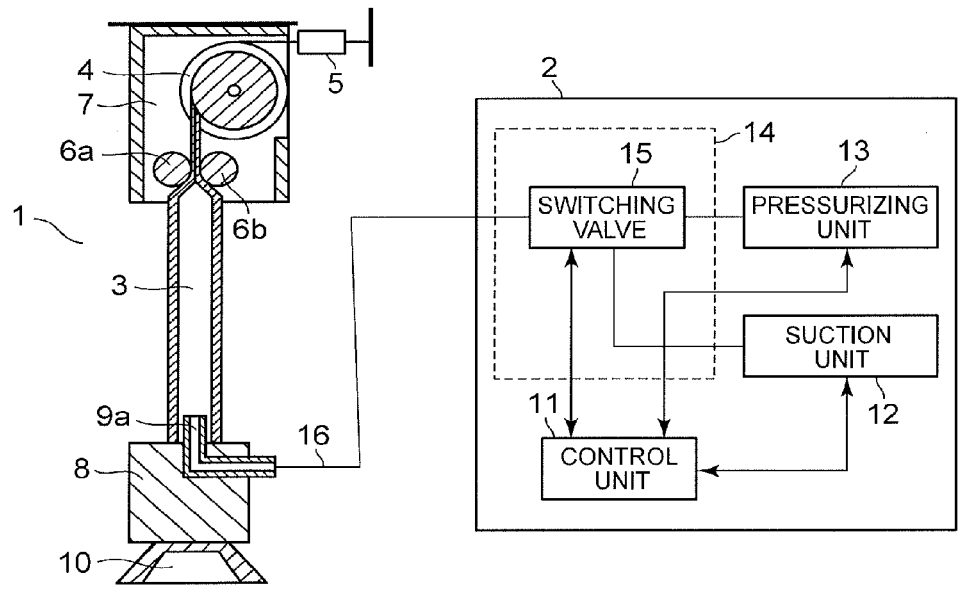
FIG. 11 is a diagram showing an article holding system according to a second embodiment.

FIG. 11 is an article holding system according to a second embodiment. The suction pad 10 of the present embodiment is a resin-made or a rubber-made sucker, for example, which elastically deforms when a suction surface thereof is pressed to a surface to be sucked, and thereby the internal space with the surface to be sucked is crushed. Or, an adhesive agent may be used which can adhere to a surface to be sucked, in place of the suction pad 10. As the material of the suction pad, fluoro rubber, nitrile rubber, silicone rubber, conductive silicone rubber, conductive butadiene rubber, natural rubber, polyurethane rubber, fluoro rubber, and so on can be used, for example. The other configuration is the same configuration as the article holding system of the first embodiment.

In the article holding system according to the second embodiment, since fluid does not flow into or out from the suction pad 10, the configuration around the suction pad 10 can be made compact, and since the tube 18 to connect the suction pad 10 and the switching valve 15 is not provided, catching of the tube at the time of extension and contraction operation of the flat tube 3 can be reduced.

Third Embodiment

Figure 12:
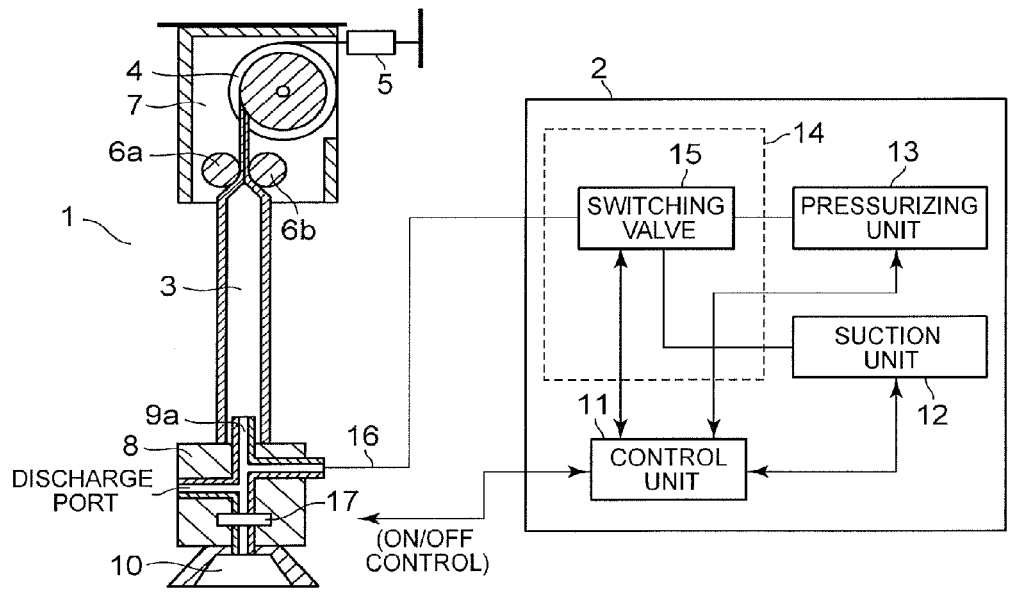
FIG. 12 is a diagram showing an article holding system according to a third embodiment.

FIG. 12 is an article holding system according to a third embodiment. This article holding system has a vacuum generator 17 (a negative pressure generator) which is connected to the flat tube 3 in the state that air can be circulated between itself and the flat tube 3. The other configuration has the same configuration as the article holding system of the above-described first embodiment. Accordingly, here, the same symbols are given to the constituent elements functioning in the same manner as the first embodiment, and the detailed description thereof will be omitted.

The vacuum generator 17 is a device to generate vacuum using pressurized air to be sent into the inner space of the flat tube 3, and in the present embodiment, a vacuum ejector is used as the vacuum generator 17. Besides, the vacuum generator 17 may be a vacuum pump, a vacuum blower or the like, for example. This vacuum generator 17 is connected to the suction pad 10, and evacuates the inner space of the suction pad 10.

Figure 13:
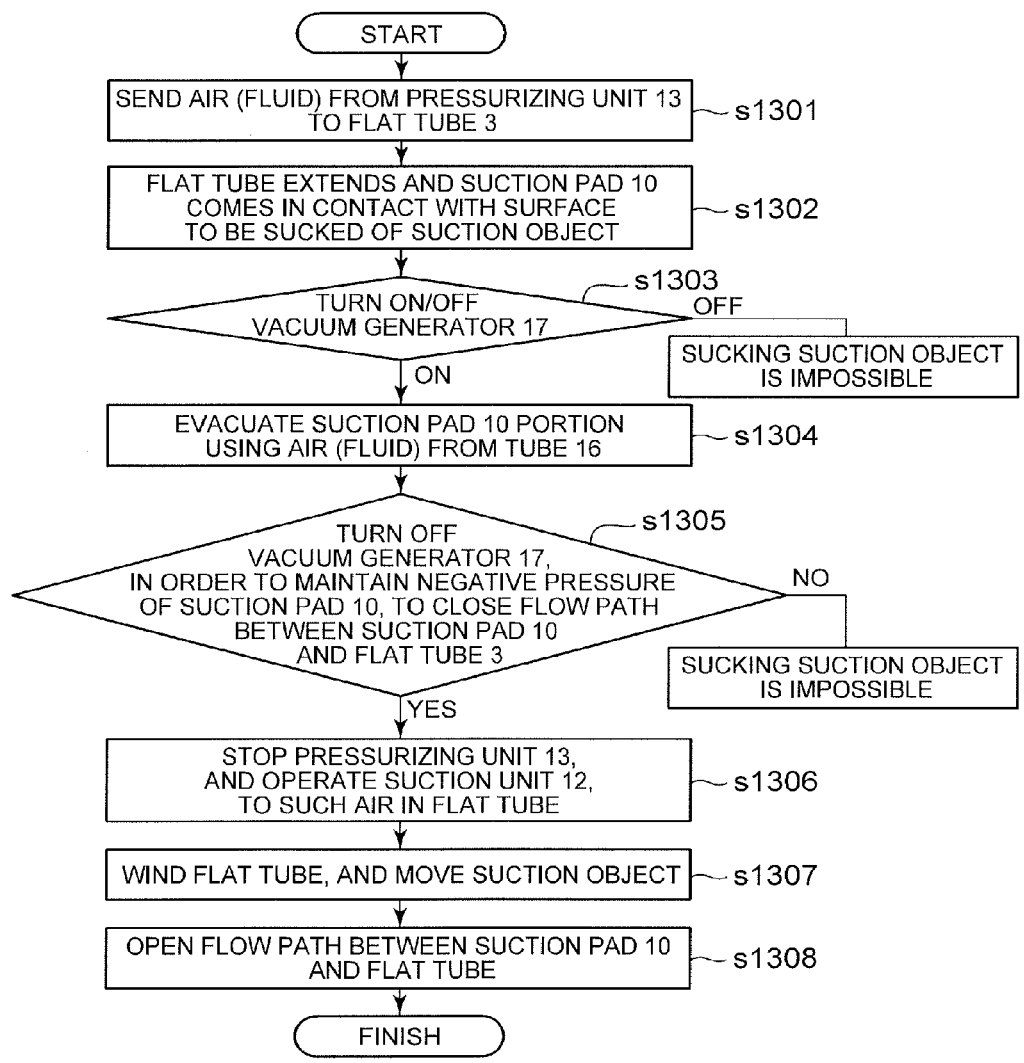
FIG. 13 is a flow chart showing the article holding system according to the third embodiment.

FIG. 13 is a diagram showing a flow chart at the time of holding the suction object T by the vacuum generator 17.

In the case of sucking the suction object T using this article holding device 1, to begin with, the control unit 11 in the fluid control device 2 flows pressurized air into an inside of the flat tube 3 in the same manner as the first embodiment, and thereby extends the flat tube 3 (s1301). When the suction pad 10 comes in contact with the surface to be sucked of the suction object T (s1302), the vacuum generator 17 is operated (On) (s1303). Specifically, when the vacuum generator 17 is operated (ON), a valve existing in a flow path between the flat tube 3 and suction pad 10 is opened. Air is supplied from the tube 16 shown in FIG. 12, and thereby a flow of air which flows through inside the holding portion 8 and flows to the flat tube 3 side, and a flow of air to a discharge port side of the holding portion 8 are caused. Since high pressure air is supplied, while following a flow of the air to the discharge port side, the air in the suction pad 10 is discharged to the discharge port side and is evacuated (s1304). In the case of Off, since the valve is not opened, the evacuation inside the suction pad 10 is not performed, and the suction object cannot be sucked.

A timing when the suction pad 10 is made in contact with the suction object T and a timing when evacuation is started may be reverse. It is possible to surely make the suction object T to be sucked to the suction pad 10, without pressing the suction surface of the suction pad 10 to the surface to be sucked of the suction object T.

Then, the control unit 11 operates the suction unit 12 to contract the flat tube 3, and lifts the suction object T. At this time, the control unit 11 firstly stops the operation of the vacuum generator 17 to close the valve with the flat tube 3, and thereby seals the inner space of the flat tube 3 (s1305). Then, the suction unit 12 is operated to suck the air inside the flat tube 3 (s1306). In addition, in the state that the valve between the vacuum generator 17 and the flat tube 3 is closed, the negative pressure acting between the suction surface of the suction pad 10 and the surface to be sucked of the suction object T is maintained. When the valve is not closed, since the air in the flat tube 3 cannot be sucked, it is impossible to move the suction object.

Then, the suction object T is moved to a desired place by an operation of a manipulator (s1307). The control unit 11 extends the flat tube 3, to place the suction object T on the floor, and eliminates the negative pressure of the suction pad 10. At this time, the control unit 11 sends pressurized air from the flat tube into the suction pad 10, via the vacuum generator 17, and eliminates the negative pressure (s1308).

As described above, according to the third embodiment, it is possible to exert the same effect as the above-described first embodiment. In addition, the negative pressure is positively generated in the suction pad 10, even when the surface to be sucked of an article is inclined, it is possible to suck the suction object T more surely, and it is possible to practically eliminate a possibility that the suction target T may be dropped in the middle of the movement. Further, when the suction pad 10 and the suction object T are separated, since the pressurized air is sent to the suction pad 10, it is possible to surely separate the suction object T and the suction pad 10 at a desired timing, and thereby reliability in the processing can be improved.

Though electrical wirings between the vacuum generator 17 and the control unit 11 are required, since the tube 18 to perform inflow and outflow of the fluid to the suction pad 10 is not provided, the configuration around the suction pad 10 can be made compact.

Fourth Embodiment

Figure 14:
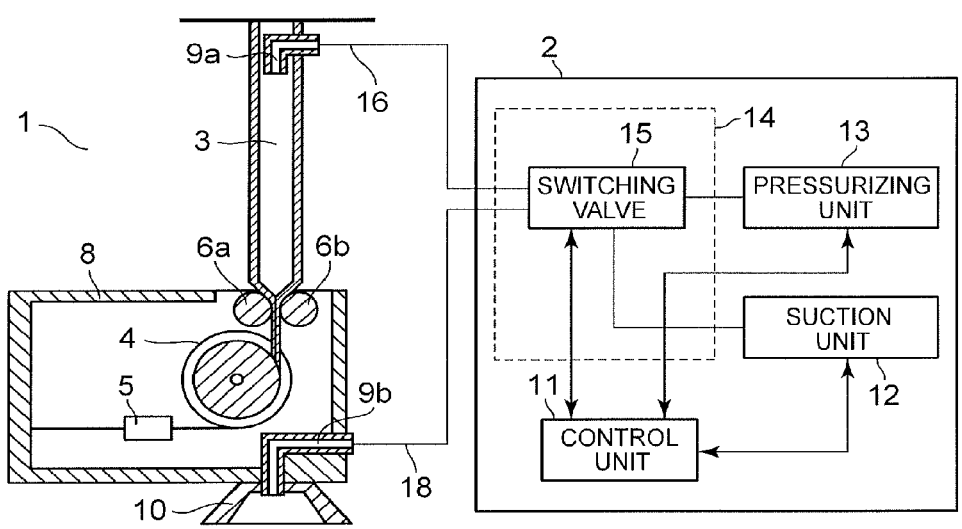
FIG. 14 is a diagram showing an article holding system according to a fourth embodiment.

FIG. 14 is an article holding system according to a fourth embodiment. In this article holding system, the winding portion 4 for winding the flat tube 3 is arranged in the holding portion 8 at the suction pad 10 side. In addition, the stress load portion 5 for winding the flat tube 3 is also arranged in the holding portion 8. Inflow and outflow of the fluid into the flat tube 3 is made from the upper end side of the flat tube 3.

Fluid flows into an inside of the flat tube 3, and thereby the flat tube 3 expands. Since the flat tube 3 is sandwiched oppositely by the roller 6a and the roller 6b, the expansion of the flat tube 3 is blocked by the sandwiching portion of the rollers 6a, 6b. At this time, the fluid is further flowed into the inside of the flat tube 3, and thereby the volume inside the flat tube 3 increases to raise the inner pressure, and if a product of the inner pressure of the flat tube 3 and an area of the sandwiching portion of the rollers 6a, 6b becomes larger than the stress of the stress load portion 5, the winding portion 4 rotates, to send out the flat tube 3. By this means, the flat tube 3 extends.

In the case of contracting the flat tube 3 from the extended state, the fluid inside the flat tube 3 is flowed out, to decrease the inner pressure. In accordance with this, the cross section of the flat tube 3 becomes in a flat state. The inner pressure of the flat tube 3 decreases, and if the product of the inner pressure of the flat tube 3 and the area of the sandwiching portion of the rollers 6a, 6b becomes smaller than the stress of the stress load portion 5, the winding portion 4 rotates by the stress, to wind up the flat tube 3. By this means, the flat tube 3 contracts.

The other configuration has the same configuration as the article holding system of the above-described first embodiment.

In the article holding system according to the fourth embodiment, the tube 16 connecting the flat tube 3 and the switching valve 15 is provided at not the suction pad 10 side, catching of this tube can be reduced at the time of extension and contraction of the flat tube 3.

Fifth Embodiment

Figures 15A, 15B:
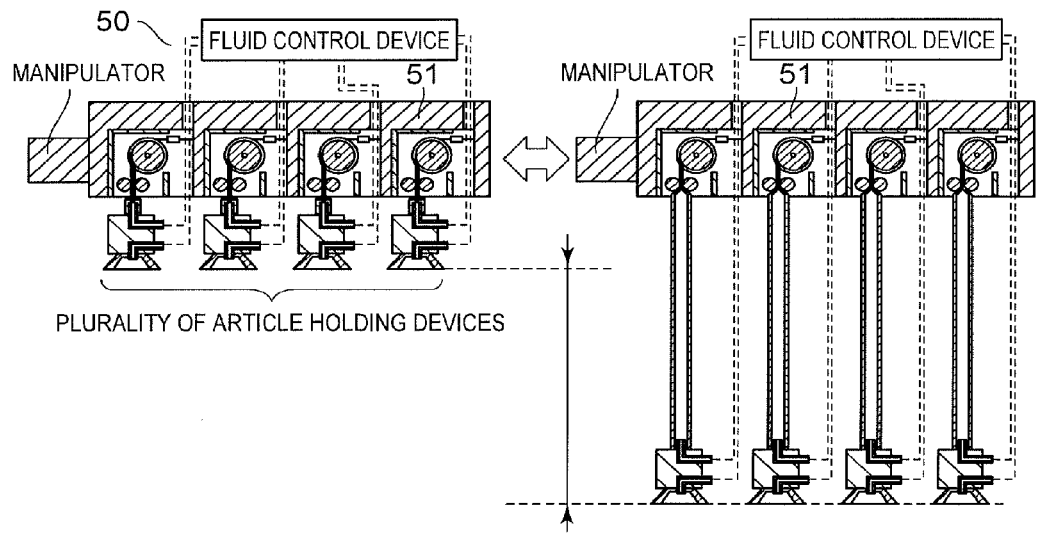
FIG. 15A is an overall diagram showing an article holding system according to a fifth embodiment.
FIG. 15B is an overall diagram showing an article holding system according to a fifth embodiment.

FIG. 15 is an article holding system 50 according to a fifth embodiment (here, only the configuration of the main portion is shown). This article holding system 50 has a configuration in which a plurality of the above-described article holding devices 1 of the first embodiment are provided in parallel at the lower surface side of a hand 51 (a grasping portion). A control system is approximately the same as the first embodiment. The hand 51 has a chassis of a rectangular block shape extending in the horizontal direction. A plurality of the flat tubes and suction pads of a plurality of the article holding devices are connected respectively to the switching valves 15 via a plurality of individual tubes. Since the other configuration is approximately the same as the above-described first embodiment, the same symbols are given to the constituent elements functioning in the same manner as the first embodiment, and the detailed description thereof will be omitted.

The switching valve 15 is shown as one block in FIG. 1, but in this embodiment, the switching valves 15 are fitted on the respective tubes of the plurality of article holding devices 1 by one for each tube.

That is, pressurized air is sent into each of the flat tubes 3 via the tube connected to it, and thereby each of the flat tubes extends, and air is sucked via each of the tubes, and thereby each of the flat tubes 3 contracts. And the negative pressure generated on the suction surface of each of the suction pads 10 can be ON/OFF controlled individually by independently switching the switching valve 15 provided for each tube.

In addition, the article holding system 50 of the present embodiment includes a manipulator not shown here, in addition to the hand 51 shown in FIG. 15. The manipulator is a so-called robot arm with the hand 51 fitted on the tip end of the arm (not shown), and moves a plurality of the article holding devices 1 to a desired place, by moving the hand 51 to a desired position.

FIG. 16 is a diagram for explaining an example of an operation to suck the suction object T by the above-described article holding system 50. This operation example shall handle the suction object T having an upper surface of a convex concave shape, for example, supposing a case that heights of surfaces to be sucked which the suction pads of respective article holding devices 1 face are different. Or a case of simultaneously sucking and holding a plurality of the suction objects T having different sizes becomes the similar suction operation.

Figures 16A, 16B:
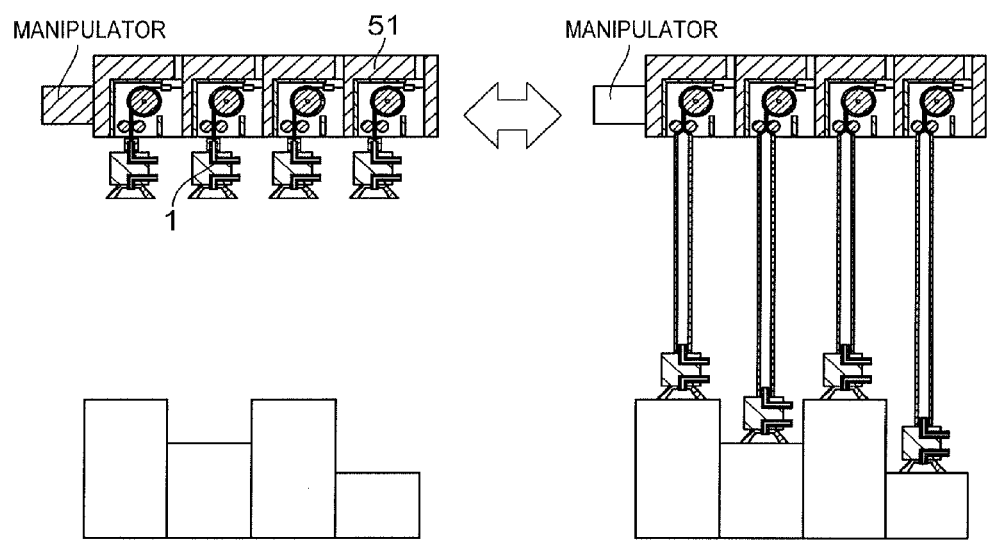
FIG. 16A is a diagram showing an example of a holding operation of the article holding system according to the fifth embodiment.
FIG. 16B is a diagram showing an example of a holding operation of the article holding system according to the fifth embodiment.

In the case of sucking the suction object T shown in FIG. 16A, the article holding system 50 firstly makes the hand 51 in the horizontal posture and arranges a plurality of the article holding devices 1 above the suction object T. In this state, the control units 11 switch the switching valves 15 so as to connect the tubes to the pressurizing units 13, respectively, and sequentially send pressurized air to the inner spaces of the flat tubes 3 of the plurality of article holding devices 1.

As shown in FIG. 16B, the flat tubes 3 of the whole article holding devices 1 extend, and the suction surfaces of the respective suction pads 10 are pressed to the surfaces to be sucked of the suction object T. Timings of the evacuation of the respective suction pads 10 can be determined to, a timing shown in FIG. 16A, for example, before the suction surfaces of the suction pads 10 come in contact with the surfaces to be sucked, timings when the suction surfaces of the suction pads come in contact with the surfaces to be sucked, respectively, or a timing when the suction surfaces of the whole suction pads 10 come in contact with the surfaces to be sucked.

In the present operation example, the surfaces to be sucked are of a convex concave shape as shown in the drawing, and since the heights of the surfaces to be sucked with which the respective suction pads 10 come in contact are random, in the state that the whole suction pads 10 are made in contact with the surfaces to be sucked, the extension lengths of the flat tubes 3 are also random as shown in the drawing. In addition, in the article holding system 50 of the present embodiment, since it is possible to send pressurized air to the whole flat tubes 3 via the plurality of tubes, it is possible to separately set orders and speeds in which the flat tubes 3 extend.

Specifically, after the pressurized air is sent and the extension operations of the flat tubes 3 are started, when the one suction pad 10 comes in contact with the opposite surface to be sucked, the air is not further sent to the flat tube 3 of the article holding device 1 provided with the relevant suction pad 10, and thereby the extension operation of the relevant article holding device 1 stops. That is, the air which has been sent into the suction tube 3 of this article holding device 1 comes to be sent to the flat tubes of the other article holding devices, because the insides of the switching valves 15 are communicated.

In this manner, the extension operations of the flat tubes 3 of the article holding devices 1 each provided with the suction pad which has come in contact with the surface to be sucked are sequentially stopped, and accordingly, the whole suction pads 10 are in contact with the respective opposite surfaces to be sucked, as shown in FIG. 16B. In addition, the pressing forces of the whole suction pads to the surfaces to be sucked are increased by the pressurized air to be further sent, after the whole suction pads 10 come in contact with the surfaces to be sucked.

At the time of making the respective suction pads 10 in contact with the surfaces to be sucked of the suction object T in this manner, since the flat tubes 3 have a high straight travel property, the adjacent article holding devices do not interfere with each other. In addition, as described above, since the extension operation of the flat tube 3 automatically stops when the suction pad 10 comes in contact with the surface to be sucked, it is not necessary to adjust the lengths of the flat tubes 3 of the respective article holding devices in accordance with the heights of the surfaces to be sucked, and thereby the article holding device 50 can easily be controlled. Further, even when the surface to be sucked is inclined, the flat tube 3 bends, and thereby the inclination of the surface to be sucked can be absorbed, and accordingly, it is possible to surely make the suction pad 10 suck the surface to be sucked.

In addition, in a case that a diameter of the flat tube 3 is small, when the suction pad comes in contact with an object, the flat tube 3 bends by its pressing force, and thereby it is possible to prevent that excessive pressing force is applied to the object from the suction pad 10.

In the case of sucking and holding simultaneously two suction objects T1, T2 having different sizes, as shown in FIG. 17, to begin with, the hand 51 of the article holding system 50 is arranged above the suction objects T1, T2. And the manipulator is operated, to move the hand 51 downward, and thereby the suction pads 10 of a part of the article holding devices 1 are made in contact with a surface to be sucked of the suction object T1 of a large size (a height of the surface to be sucked is high). Further, pressurized air is sent into the flat tubes 3 of the whole article holding devices 1, to extend the flat tubes 3, and thereby the suction pads 10 of the remaining article holding devices 1 are made in contact with a surface to be sucked of the suction object T2 of a relatively small size (a height of the surface to be sucked is low). A timing when the negative pressure is generated in each of the suction pads is optional.

In the case of moving the suction objects T1, T2 sucked in this manner, they may be raised by a definite amount in a posture that the suction objects T1, T2 are sucked, and then the hand 51 may be moved to a desired place by operating the manipulator, or in a state (FIG. 17E) that the flat tubes 3 of the whole article holding devices 1 are contracted, and the whole suction objects T1, T2 are lifted, the hand 51 may be moved to a desired place by operating the manipulator. When the suction objects T1, T2 are moved in a posture of FIG. 17D, a process to lift the suction object T2 is eliminated, and thereby a tact time can be made shorter.

On the other hand, if the suction objects T1, T2 are moved in a posture of FIG. 17E, the flat tubes have been wound up completely, a risk that the suction object T2 may swing and drop in the middle of the movement can be made small, and thereby the reliability thereof can be improved.

As described above, according to the present embodiment, a suction object is sucked using a plurality of the article holding devices, it is possible to suck and hold a suction object of a relatively large size and a relatively heavy suction object. For this reason, according to the present embodiment, even when one article holding device is damaged, since it can be aided by the other article holding devices, it is possible to improve the reliability of article holding.

In addition, a plurality of the article holding devices are used, and even when it becomes impossible to suck a suction object by one article holding device due to some cause in the middle of the movement, for example, since the suction object can be sucked and held by the other article holding devices, it is possible to prevent a trouble that the suction object T drops. In addition, in this case, the switching valve 15 connected to the suction pad which is not in contact with the suction object is closed.

Since the flat tube 3 which can flexibly change a posture thereof in accordance with a state of an article is used, even in the case of a suction object whose surface to be sucked is inclined or curved, or a suction object such as a bundle of sheets whose posture is deformable, it is possible to surely suck such a suction object, and the suction state is difficult to be released when it is lifted.

Further, a sensor for detecting a length of the flat tube 3 of each of the article holding devices, and a sensor for detecting a pressure of pressurized air to be sent into an inner space of the flat tube are provided, and thereby various characteristics of a suction object can also be detected. As the sensor for detecting a length of each flat tube, a laser displacement gauge, a linear encoder, a ultrasonic sensor, and so on are considered, for example, but any one can be used as long as it can measure a length. As the sensor for detecting a pressure of pressurized air, a sensor such as a pressure sensor is preferable. The suction pads of a plurality of the article holding devices 1 are made in contact with surfaces to be sucked of a plurality of the suction objects T having different sizes, and lengths of the flat tubes of the respective article holding devices are detected, and thereby the suction objects can be recognized separately for each size. In addition, at the time of sucking and moving a suction object, a length of the flat tube 3 is detected, and thereby an approximate weight of the suction object can be discriminated. In addition, at the time of moving down a suction object which has been sucked and held on a floor surface, a length of the flat tube 3 is monitored, and thereby it is possible to judge whether or not the suction object has come in contact with the floor surface.

A position sensor to measure a height between the suction pad 10 and a suction object is provided in the holding portion 8, and a mechanism to brake when the suction pad 10 comes in contact with the suction object may be provided in the winding portion 4. Position information of the suction pad 10 and a suction object is obtained not only from the position sensor, but also may be obtained from a camera fitted on a manipulator, a camera installed in a factory, or a camera fitted on a basket cart in which an article is housed, or the like.

In addition, an operator may operate each of the article holding devices via the input unit 80. In its case, the operator can also operate it by displaying position information of an article from a camera fitted on a manipulator, a camera installed in a factory, or a camera fitted on a basket cart in which an article is housed, on a panel or a monitor. The above-described operation may only be an On/Off operation of each of the article holding devices. When turned On, the article holding device extends, and automatically sucks and lifts an article, and when turned Off, the article holding device may bring down the article to a prescribed position.

In addition, a pressure of pressurized air to be sent into the flat tube 3 of each of the article holding devices is detected, and thereby presence or absence of damage of the flat tube 3 can be judged, and accordingly, it is possible to acquire a proper timing for repair, before a serious accident such as drop of a suction object occurs.

At any rate, an operation of the article holding system 50 of the present embodiment can be executed based on a program that is software. A general-purpose computer system previously stores this program, and reads this program, and thereby the operation of the above-described article holding system 50 is enabled. That is, the above-described operation example is recorded, as a computer executable program, in a magnetic disk (a flexible disk, a hard disk, or the like), an optical disk (a CD-ROM, a CD-R, a CD-RW, a DVD-ROM, a DVD±R, a Blue-ray (registered trademark) Disc or the like), a semiconductor memory, or a recording medium similar to this. If the recording medium is a recording medium which a computer or an incorporated system can read, its storage format may be any form. A computer reads the program from this recording medium, and makes a CPU execute the instruction stated in the program based on this program, and thereby the above-described operation can be realized. As a matter of course, in a case that a computer acquires or reads the program, the computer may acquire or read the program via a network.

In addition, an OS (Operating System) which is working on a computer based on an instruction of the program installed in the computer or an incorporated system from a recording medium, data base management software, a MW (Middleware) such as a network may execute a part of respective processings for realizing the present operation example.

Further, the recording medium to be used here is not limited to a medium independent from a computer or an incorporated system, but a recording medium which stores or temporarily stores a program transmitted by a LAN, Internet or the like by downloading is also included in the recording medium.

In addition, the number of the recording mediums is not limited to one, but a processing in the present operation example may be executed from a plurality of mediums, and a configuration of the medium may be any configuration.

In addition, the computer or the incorporated system used here is one for executing respective processings based on the program stored in the recording medium, and may be any configuration, such as an apparatus composed of one of a personal computer, a microcomputer and so on, and a system in which a plurality of devices are connected via a network.

In addition, a computer used here is not limited to a personal computer, but includes an arithmetic processing unit, a microcomputer, and so on included in an information processing unit, and a unit and a device which can realize a function by a program are generally called a computer.

In addition, in the above-described fifth embodiment, the case that a plurality of the article holding devices 1 of the first embodiment are provided in parallel in the hand 51 has been described, but the article holding device of the second embodiment, or the article holding device of the third embodiment or the article holding device of the fourth embodiment may be used solely or in combination.

Sixth Embodiment

In the present embodiment, an embodiment which is not limited to holding of an article will be described.

The present embodiment is provided with a fixed portion provided with a drawing portion, a movable portion which can move to the fixed portion, a hollow member connecting the drawing portion and the movable portion, a sandwiching portion to sandwich the hollow member located between the drawing portion and the movable portion, and a fluid control device which supplies fluid into an inside of the hollow member between the sandwiching portion and the movable portion. The drawing portion has a stress load portion to generate stress in the drawing direction, and draws the hollow member. The movable portion has wheels, for example, and can also move in the horizontal direction.

When fluid is supplied from the fluid control device to the inside of the hollow member, the hollow member expands, and when a pressure applied to the sandwiching portion becomes larger than the stress of the stress load portion, the hollow member is drawn out from the drawing portion. By this means, the movable portion moves in a direction to separate from the fixed portion, for example.

On the other hand, when the fluid inside the hollow member is discharged by the fluid control device, the hollow member contracts, and when the pressure applied to the sandwiching portion becomes smaller than the stress of the stress load portion, the hollow member is drawn into the drawing portion. By this means, the movable portion moves in a direction to come close to the fixed portion side, for example.

By using the operation of this movable portion, the present embodiment can be used for transportation of an article to a danger zone into which a person cannot step, for example, for installation of an article to a remote place, and so on.

In the above-described first to fifth embodiments, a case that the flat tube 3 is used, as the extension and contraction member which extends and contracts by expanding and contracting an inner space thereof by pressure of fluid, has been described, but without being limited to this, an expansion and contraction member or the like in which a deformation direction of a balloon that is a hollow member and can expand and contract is regulated to one direction may be used.

The roller 6a and the roller 6b which are opposite have been used for sandwiching the flat tube 3, but without being limited to the rollers, since they can be replaced by slits or clips, the sandwiching portion including these may be used. In addition, in the above-described embodiment, the winding portion 4 has been used for winding the flat tube 3, but without being limited to the winding portion 4, but since the flat tube 3 may be drawn upward by an air cylinder or a motor, the drawing portion including the winding portion may be used.

In addition, the drawing portion may include the sandwiching portion. In addition, since the base 7 and the fixing position of the stress load portion 5 include fixing of the flat tube 3, the base 7 and the fixed portion of the stress load portion 5 may be generally called the fixed portion. In addition, the holding portion is not limited only to holding of an article, the holding portion may be called the moving portion as a position which can move in contrast to the fixed portion.

In addition, in the above-described embodiment, the switching valve 15 is configured by the electromagnetic valve 14, but without being limited to this, a switching valve which acts by air pressure may be used. In this case, wiring for connecting the electromagnetic valve 14 is eliminated, and thereby the configuration of the device can be simplified.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article holding system, comprising:
   a fixed portion;
   a movable portion;
   a hollow member, which is a flat tube, located between the fixed portion and the movable portion;
   a drawing portion to draw in the hollow member; and
   a fluid control device to supply fluid to an inside of the hollow member;
   wherein a cross section of the flat tube changes from a flat state to an expansion state when the fluid is supplied by the fluid control device into the hollow member, and the hollow member is drawn out from the drawing portion, to change a distance between the fixed portion and the movable portion.

2. The article holding system according to claim 1: wherein the drawing portion has a sandwiching portion to sandwich the hollow member.

3. The article holding system according to claim 2: wherein the drawing portion is installed in the movable portion.

4. The article holding system according to claim 3: wherein the sandwiching portion comprises a pair of opposite rollers.

5. The article holding system according to claim 1: wherein the movable portion has a suction pad to suck an article.

6. The article holding system according to claim 1: wherein the movable portion has a suction pad, and a vacuum generator which, in a state that the suction pad is in contact with an article, discharges the fluid between the suction pad and the article, using the fluid to be supplied in the hollow member.

7. The article holding system according to claim 1: wherein the hollow member contracts in a state that the fluid is discharged by the fluid control device, and expands in a state that the fluid is supplied by the fluid control device.

8. The article holding system according to claim 1: wherein the drawing portion includes a roller to draw in the hollow member, and a stress load portion to connect the roller and the fixed portion.

9. The article holding system according to claim 1: wherein the fluid control device comprises a pressurizing unit to supply the liquid to the hollow member, a suction unit to discharge the fluid from the hollow member, a switching valve to switch supply and discharge of the fluid to and from the hollow member, and a control unit which operates the switching valve to control supply and discharge of the fluid.

10. The article holding system according to claim 9, further comprising:
a pressure detection unit to detect a pressure of the fluid to be supplied to the hollow member;
a flow rate detection unit to detect a flow rate of the fluid to be supplied to the hollow member; and
a rotation angle detection unit to detect an operation amount of the drawing portion;
wherein the control unit controls supply and discharge of the fluid in accordance with detection results of the pressure detection unit, the flow rate detection unit and the rotation angle detection unit.

11. An article holding system, comprising:
a fixed portion;
a movable portion;
a hollow member, which is a flat tube, located between the fixed portion and the movable portion;
a drawing portion to draw in the hollow member; and
a fluid control device to discharge fluid from an inside of the hollow member;
wherein the hollow member is drawn in by the drawing portion and becomes in a flat state in a state that the fluid is discharged from the hollow member by the fluid control device, to change a distance between the fixed portion and the movable portion.

12. An article holding device, comprising:
a fixed portion;
a movable portion to hold an article;
a hollow member, which is a flat tube, located between the fixed portion and the movable portion;
a drawing portion to draw in the hollow member;
wherein when fluid is supplied into the hollow member, the hollow member is deformed by forces generated in short directions of the cross section of the flat tube, and the hollow member is drawn out from the drawing portion to, change a distance between the fixed portion and the movable portion.

* * * * *